(12) United States Patent
Iftime et al.

(10) Patent No.: US 8,360,546 B2
(45) Date of Patent: Jan. 29, 2013

(54) PHASE CHANGE MAGNETIC INK AND PROCESS FOR PREPARING SAME

(75) Inventors: Gabriel Iftime, Mississauga (CA); C. Geoffrey Allen, Waterdown (CA); Caroline Turek, Mississauga (CA); Peter G. Odell, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 180 days.

(21) Appl. No.: 12/976,410

(22) Filed: Dec. 22, 2010

(65) Prior Publication Data

US 2012/0162306 A1    Jun. 28, 2012

(51) Int. Cl.
*B41J 2/015* (2006.01)

(52) U.S. Cl. ............... 347/20; 347/95; 347/100; 347/99

(58) Field of Classification Search .................... 347/20, 347/21, 95, 96, 99, 100; 106/31.6, 31.13, 106/31.27; 523/160, 161
See application file for complete search history.

(56) References Cited

U.S. PATENT DOCUMENTS

| | | | |
|---|---|---|---|
| 4,830,671 A | 5/1989 | Frihart et al. | |
| 4,889,560 A | 12/1989 | Jaeger et al. | |
| 4,889,761 A | 12/1989 | Titterington et al. | |
| 5,194,638 A | 3/1993 | Frihart et al. | |
| 5,372,852 A | 12/1994 | Titterington et al. | |
| 5,597,856 A | 1/1997 | Yu et al. | |
| 5,667,924 A | 9/1997 | Ziolo | |
| 5,703,145 A * | 12/1997 | Sagawa et al. | 523/161 |
| 5,750,604 A | 5/1998 | Banning et al. | |
| 5,780,528 A | 7/1998 | Titterington et al. | |
| 5,782,966 A | 7/1998 | Bui et al. | |
| 5,783,658 A | 7/1998 | Banning et al. | |
| 5,827,198 A | 10/1998 | Kassal | |
| 5,830,942 A | 11/1998 | King et al. | |
| 5,919,839 A | 7/1999 | Titterington et al. | |
| 6,174,937 B1 | 1/2001 | Banning et al. | |

(Continued)

FOREIGN PATENT DOCUMENTS

| | | |
|---|---|---|
| GB | 2294939 | 5/1996 |
| GB | 2305928 | 4/1997 |

(Continued)

OTHER PUBLICATIONS

Sang-Jae Park et al., Synthesis and Magnetic Studies of Uniform Iron Nanorods and Nanospheres, J. Am. Chem. Soc., Aug. 18, 2000, pp. 8581-8582.

(Continued)

*Primary Examiner* — Juanita D Jackson
(74) *Attorney, Agent, or Firm* — Marylou J. Lavoie

(57) ABSTRACT

An in situ process for preparing a phase change magnetic ink including combining a phase change ink composition with a reducing agent; wherein the phase change ink composition comprises a carrier, an optional colorant, and an optional dispersant, and wherein the reducing agent has at least one alcohol functionality; heating the combined phase ink composition and reducing agent to a first temperature sufficient to provide a melt composition; adding a metal salt to the melt composition under an inert atmosphere to provide a metal salt-melt composition; heating the metal salt-melt composition to a second temperature sufficient to effect a metal reduction reaction to reduce the metal salt to metal nanoparticles thus forming in situ a phase change magnetic ink including the metal nanoparticles; optionally, filtering the phase change magnetic ink while in a liquid state; cooling the phase change magnetic ink to a solid state.

20 Claims, 1 Drawing Sheet

U.S. PATENT DOCUMENTS

| | | | |
|---|---|---|---|
| 6,255,432 | B1 | 7/2001 | Evans et al. |
| 6,309,453 | B1 | 10/2001 | Banning et al. |
| 6,860,930 | B2 | 3/2005 | Wu et al. |
| 2009/0321676 | A1 | 12/2009 | Breton et al. |
| 2009/0325098 | A1 | 12/2009 | Veregin et al. |
| 2012/0162330 | A1 | 6/2012 | Iftime et al. |

FOREIGN PATENT DOCUMENTS

| | | |
|---|---|---|
| WO | WO 94/14902 | 7/1994 |
| WO | WO 95/04760 | 2/1995 |

OTHER PUBLICATIONS

C. B. Murray et al., Monodisperse 3d Transition Metal (Co, Ni, Fe) Nanoparticles and Their Assembly Into Nanoparticle Superlattices, MRS Bulletin, Dec. 2001, pp. 985-991.

Girija S. Chaubey et al., Synthesis and Stabilization of FeCo Nanoparticles, J. Am. Chem. Soc., May 12, 2007, pp. 7214,7215.

B. Martorana et al., Preparation of Plastic Ferromagnetic Composite Materials for Magnetic Encoders, Sensors and Actuators, Apr. 24, 2006, pp. 176-179.

* cited by examiner

PHASE CHANGE MAGNETIC INK AND PROCESS FOR PREPARING SAME

RELATED APPLICATIONS

Commonly assigned U.S. patent application Ser. No. 12/976,451, filed concurrently herewith, which is hereby incorporated by reference herein in its entirety, describes an in situ process for preparing a phase change magnetic ink comprising heating a phase change ink composition to a first temperature sufficient to provide a melt composition; wherein the phase change ink composition comprises a carrier, an optional colorant, and an optional dispersant; placing the melt composition under inert atmosphere; heating the melt composition to a second temperature sufficient to effect decomposition of a metal carbonyl; adding the metal carbonyl to the melt composition under an inert atmosphere at this second temperature to form metal nanoparticles thus forming in situ a phase change magnetic ink including the metal nanoparticles; optionally, filtering the phase change magnetic ink while in a liquid state, and; cooling the phase change magnetic ink to a solid state.

BACKGROUND

Disclosed herein is a phase change magnetic ink and an in situ process for preparing a phase change magnetic ink.

Magnetic Ink Character Recognition (MICR) ink contains a magnetic pigment or a magnetic component in an amount sufficient to generate a magnetic signal strong enough to be readable via a MICR reader. Generally, the ink is used to print all or a portion of a document, such as checks, bonds, security cards, etc.

U.S. Pat. No. 5,667,924, which is hereby incorporated by reference herein in its entirety, describes in the Abstract thereof an image character recognition process comprising forming an image in a predetermined size and predetermined shape on a receiver member with a marking composition containing a superparamagnetic component, detecting the predetermined size and predetermined shape of the formed image by placing the resulting image bearing receiver member in a magnetic sensing field comprising at least one magnetic sensor and forming a magnetic size and magnetic shape profile map of the detected image, and recognizing the detected image by comparing the magnetic size and magnetic shape profile map of the formed image with reference magnetic profile image maps.

MICR inks or toners are made by dispersing magnetic particles into an ink base. There are numerous challenges in developing a MICR ink jet ink. For example, most ink jet printers limit considerably the particle size of any particulate components of the ink, due to the very small size of the ink jet print head nozzle that expels the ink onto the substrate. The size of the ink jet head nozzle openings are generally on the order of about 40 to 50 microns, but can be less than 10 microns in diameter. This small nozzle size requires that the particulate matter contained in an ink jet ink composition must be of a small enough size to avoid nozzle clogging problems. Even when the particle size is small than the nozzle size, the particles can still agglomerate or cluster together to the extent that the size of the agglomerate exceeds the size of the nozzle opening, resulting in nozzle blockage. Additionally, particulate matter may be deposited in the nozzle during printing, thereby forming a crust that results in nozzle blockage and/or imperfect flow parameters.

Further, a MICR ink jet ink must be fluid at jetting temperature and not dry. An increase in pigment size can cause a corresponding increase in ink density thereby making it difficult to maintain the pigments in suspension or dispersion within a liquid ink composition.

MICR inks contain a magnetic material that provides the required magnetic properties. The magnetic material must retain a sufficient charge so that the printed characters retain their readable characteristic and are easily detected by the detection device or reader. The magnetic charge retained by a magnetic material is known as "remanence." The "coercive force" of a magnetic material refers to the magnetic field H which must be applied to a magnetic material in a symmetrical, cyclically magnetized fashion to make the magnetic induction B vanish. The coercivity of a magnetic material is thus the coercive force of the material in a hysteresis loop whose maximum induction approximates the saturation induction. The observed remanent magnetization and the observed coercivity of a magnetic material depend on the magnetic material having some anisotropy to provide a preferred orientation for the magnetic moment in the crystal. Four major anisotropy forces determine the particle coercive force: magnetocrystalline anisotropy, strain anisotropy, exchange anisotropy, and shape anisotropy. The two dominant anisotropies are: 1) shape anisotropy, where the preferred magnetic orientation is along the axis of the magnetic crystal, and 2) magnetocrystalline anisotropy, where the electron spin-orbit coupling aligns the magnetic moment with a preferred crystalline axis.

The magnetic material must exhibit sufficient remanence once exposed to a source of magnetization in order to generate a MICR-readable signal and have the capability to retain the same over time. Generally, an acceptable level of charge, as set by industry standards, is between 50 and 200 Signal Level Units, with 100 being the nominal value, which is defined from a standard developed by ANSI (American National Standards Institute). A lesser signal may not be detected by the MICR reading device, and a greater signal may not give an accurate reading. Because the documents being read employ the MICR printed characters as a means of authenticating or validating the presented documents, it is important that the MICR characters or other indicia be accurately read without skipping or misreading characters. Therefore, for purposes of MICR, remanence is preferably a minimum of 20 emu/g (electromagnetic unit/gram). A higher remanence value corresponds to a stronger readable signal.

Remanence tends to increase as a function of particle size and the density of the magnetic pigment coating. Accordingly, when the magnetic particle size decreases, the magnetic particles to experience a corresponding reduction in remanence. Achieving sufficient signal strength thus becomes increasingly difficult as the magnetic particle size diminishes and the practical limits on percent content of magnetic particles in the ink composition are reached. A higher remanence value will require less total percent magnetic particles in the ink formula, improve suspension properties, and reduce the likelihood of settling as compared to an ink formula with higher percent magnetic particle content.

Additionally, MICR ink jet inks must exhibit low viscosity, typically on the order of less than 15 centipoise (cP) or about 2 to 8 cP at jetting temperature (jetting temperature ranging from about 25° C. to about 140° C.) in order to function properly in both drop-on-demand type printing equipment, such as thermal bubble jet printers and piezoelectric printers, and continuous type printing apparatus. The use of low viscosity fluids, however, adds to the challenge of successfully incorporating magnetic particles into an ink dispersion because particle settling will increase in a less viscous fluid as compared to a more viscous fluid.

Magnetite (iron oxide, $Fe_2O_3$) is a common magnetic material used in MICR ink jet inks. Magnetite has a low magnetocrystalline anisotropy, K1, of $-1.1\times10^4$ $J/m^3$. An acicular crystal shaped magnetite, in which one crystal dimension is much larger than the other, has an aspect ratio of the major to minor size axis of the single crystal ($D_{major}/D_{minor}$) of 2.1 or larger, helps to augment the magnetic remanence and coercivity performance in inks. Acicular magnetite is typically 0.6 X 0.1 micron in size along the minor and major axis, respectively, and has a large shape anisotropy (6/1). Typical loading of iron oxide in inks is about 2 to 40 weight percents. However, due to the larger sizes and aspect ratio of acicular crystal shaped magnetite particles, they are difficult to disperse and stabilize into inks, especially for use in ink jet printing. Moreover, spherical or cubic magnetites are smaller in size (less than 200 nanometers in all dimensions), but have low shape anisotropy ($D_{major}/D_{minor}$) on order of about 1. Consequently, because of the low overall anisotropy, spherical or cubic magnetite has lower magnetic remanence and coercivity, and loadings higher than 40 weight percent are often needed to provide magnetic performance. Thus, while spherical and cubic magnetite have the desired smaller particle size of less than 200 nanometers in all dimensions, the much higher loading requirement also makes them very difficult to disperse and maintain a stable dispersion. Moreover, such high loadings of the inert, non-melting magnetic material can interfere with other ink properties, such as adhesion to the substrate and scratch resistance. Consequently, this lessens the suitability of magnetites for ink jet printing inks.

Additionally, because magnetite has a specific gravity of approximately 7, magnetite has a natural tendency to settle to the bottom of a fluid ink composition. This can result in a non-homogeneous fluid having an iron oxide-rich lower layer and an iron oxide-deficient upper layer. Moreover, suitable ink jet oxides must generally be hydrophilic in nature in order to provide good dispersion characteristics and to provide good emulsion properties. The latter parameters related directly to the ability of the magnetic particle to exhibit minimum settling and to further demonstrate the proper wetting of the magnetic particle with the other water-soluble ingredients generally present in an ink jet ink composition.

The problems associated with using iron oxide in MICR ink jet inks have been addressed in several ways. For example, an MICR ink has been prepared using a combination of surfactants in conjunction with a very small particle size metal oxide component aimed at maintaining a useful suspension or dispersion of the magnetic component within the ink composition. Another means of achieving an ink jet compatible MICR-readable printing ink is to coat the metal magnetic material with a specific hydrophilic coating to help retain the particulate magnetic metal in suspension.

Another type of ink used for MICR ink jet printing is iron complex pigment ink, such as xFerrone™ based Versalnk™. These inks are compatible with certain commercially available printers and have a variety of uses, such as ensuring reliable scanning of checks and eliminating delays at store checkout lines.

U.S. Patent Publication Number 2009/0321676A1, which is hereby incorporated by reference herein in its entirety, describes in the Abstract thereof an ink including stabilized magnetic single-crystal nanoparticles, wherein the value of the magnetic anisotropy of the magnetic nanoparticles is greater than or equal to $2\times10^4$ $J/m^3$. The magnetic nanoparticle may be a ferromagnetic nanoparticle, such as FePt. The ink includes a magnetic material that minimizes the size of the particle, resulting in excellent magnetic pigment dispersion stability, particularly in non-aqueous ink jet inks. The smaller sized magnetic particles of the ink also maintain excellent magnetic properties, thereby reducing the amount of magnetic particle loading required in the ink.

Water-based MICR ink is commercially available. Water-based MICR ink requires special print-heads to be used with certain ink jet printing technology such as phase change or solid ink technology. There is further a concern with respect to possible incompatibility when operating both solid ink and water-based ink in the same printer. Issues such as water evaporation due to the proximity to the solid ink heated ink tanks, rust, and high humidity sensitivity of the solid ink are issues which must be addressed for implementation of a water-based MICR ink in a solid ink apparatus.

Currently, there are no commercially available phase change or solid MICR inks. There is a need for a MICR ink suitable for use in phase change or solid ink jet printing. There are numerous challenges in developing a MICR ink suitable for use in phase change or solid ink jet printing. MICR phase change ink processes are particularly challenging with magnetic pigments because (1) inorganic magnetic particles are incompatible with the organic base components of phase change ink carriers, and (2) magnetic pigments are much denser than typical organic pigments (the density of iron is about 8 $g/cm^3$, for example) which can result in unfavorable particle settling, and (3) uncoated metal magnetic nanoparticles are pyrophoric thus presenting a safety issue. Further, in order to make a solid ink composition from these particles, a complex process would be required including preparation of the magnetic particles, washing of the nano-particles, followed by a multi-step procedure for fabrication of solid ink compositions containing the magnetic pigments.

Currently available MICR inks and methods for preparing MICR inks are suitable for their intended purposes. However, a need remains for MICR ink jet inks that have reduced magnetic material particle size, improved magnetic pigment dispersion and dispersion stability along with the ability to maintain excellent magnetic properties at a reduced particle loading. Further, a need remains for MICR phase change inks that are suitable for use in phase change ink jet printing technology. Further, a need remains for a process for preparing a MICR process that is simplified, environmentally safe, capable of producing a highly dispersible magnetic ink having stable particle dispersion, allowing for safe processing of metal nanoparticles, cost effective, and green.

The appropriate components and process aspects of the each of the foregoing U. S. Patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is an in situ process for preparing a phase change magnetic ink comprising combining a phase change ink composition with a reducing agent; wherein the phase change ink composition comprises a carrier, an optional colorant, and an optional dispersant, and wherein the reducing agent has at least one alcohol functionality; heating the combined phase change ink composition and reducing agent to a first temperature sufficient to provide a melt composition; adding a metal salt to the melt composition under an inert atmosphere to provide a metal salt-melt composition; heating the metal salt-melt composition to a second temperature sufficient to effect a metal reduction reaction to reduce the metal salt to metal nanoparticles thus forming in situ a phase change magnetic ink including the metal nanoparticles; optionally, filtering the phase change magnetic ink while in a liquid state; and cooling the phase change magnetic ink to a solid state. In embodiments, the reducing agent having at least one alcohol functionality and the ink base materials may be the same. For example, in embodiments, the reducing agent and the phase change ink carrier may be the same component.

Also described is a phase change magnetic ink comprising a phase change ink composition comprising a carrier, an optional colorant, an optional dispersant, and metal nanoparticles dispersed within the phase change ink, wherein the metal nanoparticles are functionalized by at least one of the phase change ink composition components, alcohol functional groups within the phase change ink composition, and the optional dispersant, which stabilize the metal nanoparticles in the phase change ink.

Also described is a process which comprises (1) incorporating into an ink jet printing apparatus a phase change magnetic ink comprising a carrier, an optional colorant, an optional dispersant, and metal nanoparticles dispersed within the phase change ink, wherein the metal nanoparticles are functionalized with at least one of the phase change ink composition components, alcohol functional groups within the phase change ink composition, and the optional dispersant, which stabilize the metal nanoparticles in the phase change ink; (2) melting the ink; and (3) causing droplets of the melted ink to be ejected in an imagewise pattern onto a substrate.

DETAILED DESCRIPTION

Figure 1:
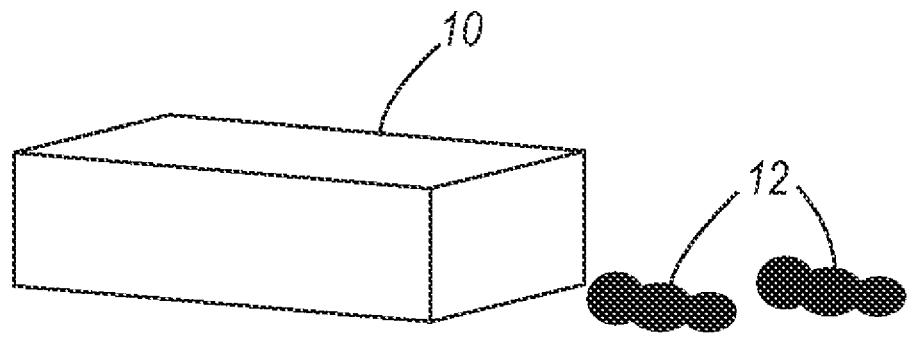
FIG. 1 is a representation of a magnet with chunks of magnetic ink in accordance with the present disclosure placed at a distance from the magnet.

An in situ process for preparing a phase change magnetic ink is described comprising combining a phase change ink composition with a reducing agent; wherein the phase change ink composition comprises a carrier, an optional colorant, and an optional dispersant, and wherein the reducing agent has at least one alcohol functionality; heating the combined phase ink composition and reducing agent to a first temperature sufficient to provide a melt composition; adding a metal salt to the melt composition under an inert atmosphere to provide a metal salt-melt composition; heating the metal salt-melt composition to a second temperature sufficient to effect a metal reduction reaction to reduce the metal salt to metal nanoparticles thus forming in situ a phase change magnetic ink including the metal nanoparticles; optionally, filtering the phase change magnetic ink while in a liquid state; and cooling the phase change magnetic ink to a solid state. Also described is a phase change magnetic ink comprising a phase change ink composition comprising a carrier, an optional colorant, an optional dispersant, and metal nanoparticles dispersed within the phase change ink, wherein the metal nanoparticles are functionalized are functionalized by at least one of the phase change ink composition components, alcohol functional groups within the phase change ink composition, and the optional dispersant, which stabilize the metal nanoparticles in the phase change ink.

Heating the combined phase ink composition and reducing agent to a first temperature sufficient to provide a melt composition can comprise heating to any temperature suitable to provide a melt composition for the selected materials. In embodiments, heating to a first temperature comprises heating to a temperature of about 60 to about 160° C., or about 100 to about 150° C., or about 110 to about 140° C.

Heating the metal salt-melt composition to a second temperature sufficient to effect a metal reduction reaction to reduce the metal salt to metal nanoparticles thus forming in situ a phase change magnetic ink including the metal nanoparticles can comprise heating to any temperature suitable to effect the metal reduction reaction for the selected materials. In embodiments, heating to a second temperature comprises heating to a temperature of about 160 to about 400° C., or about 250 to about 350° C., or about 250 to about 330° C.

Optional, filtering of the phase change magnetic ink while in a liquid state can be done by any suitable or desired method. In embodiments, the phase change magnetic ink is optionally filtered through a 1 micrometer nylon filter or a 5 micrometer nylon filter in a 70 millimeter Mott filtration assembly (available from Mott Corporation, Farmington, Connecticut) at 135° C.

The process described herein provides a magnetic ink that is made in situ, as a one step reaction, by the reduction of metal salts directly into an ink base having alcohol functionality. The magnetic nanoparticles can be constituted with the known metals having ferro-magnetic properties, such as Fe, Co, Ni and/or alloys made of these metals. As a result, the magnetic metal nanoparticles are directly stabilized by being functionalized by one or a combination of the ink base materials, alcohol functional groups in the medium, and the dispersant. The process and MICR phase change inks provided herein provide advantages over previous known and typical mechanically driven pigment dispersion techniques, including, but not limited to, providing a highly dispersible magnetic ink, providing a highly stable ink with little or no settling of magnetic particles, providing for the safe handling of metal nanoparticles as they are already functionalized and "ink-ready" in the present process, providing a cost effective process because the previous known multistep procedure is replaced by a one step procedure. In embodiments, the present process is a green process, for example, a solvent-free process, wherein no solvents are used in the preparation and isolation of product and reduced energy is required. Depending on the size and shape of the formed magnetic metal nanoparticles, the inks made according to the present disclosure may be used for MICR applications as well as, for example, in magnetic encoding or in security printing applications, among others.

The process comprises an in situ process meaning preparing the metal nanoparticles in situ while simultaneously preparing the phase change ink. In a specific embodiment, the process comprises preparing metal nanoparticles using the polyol method directly in the phase change ink in the absence of a solvent. Generally, the polyol method for producing metal nanoparticles employs an alcohol, typically a diol, as a reducing agent in a high boiling solvent and uses one or more dispersants to reduce metal salts to metal nanoparticles. The reduction reaction occurs at high temperatures such as from about 150° C. to about 350° C., or about 200° C. to about 300 C, or about 300° C. For example, the polyol method for preparing a metal nanoparticle can comprise reacting a metal salt with a diol in a suitable solvent at a suitable temperature, such as from 200° C. to 300° C. as follows:

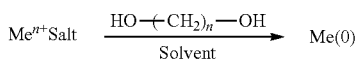

wherein $Me^{n+}$ is a metal selected from the group consisting of $Fe^{2+}$, $Fe^{3+}$, $Co^{2+}$, $Ni^{2+}$, and wherein n is an integer representing the metal charge, alloys of these metals, or a combination thereof;

wherein the salt is any suitable or desired salt, such as a salt selected from the group consisting of $Co(OH)_2$; $Fe(OH)_2$ or precursors in presence of hydroxides, $Co(Acetate)_2 \times 4H_2O$; $FeCl_2 \times 4H_2O$; $Co(acac)_2$; and $Fe(acac)_3$; wherein acac is acetate;

wherein the $(CH_2)_n$ group includes n number of $CH_2$ groups wherein n is an integer of 1 to 120;

wherein Me(0) is the metal nanoparticle product, and wherein 0 indicates zero oxidation in the metal state.

In embodiments, the metal nanoparticles are selected from the group consisting of Fe, Co, FePt, Ni, $SmCo_5$, and combinations thereof.

In embodiments, the metal ion of the metal salt is selected from the group consisting of $Fe^{2+}$, $Fe^{3+}$, $Co^{2+}$, $Ni^{2+}$, and combinations thereof; or the metal ion of the metal salt is selected from the group consisting of $Fe^{2+}$, $Fe^{3+}$, $Co^{2+}$, and $Ni^{2+}$, in combination with at least one of $Pt^{2+}$ and $Sm^{2+}$.

Metal nanoparticles herein are desirably in the nanometer size range. For example, in embodiments, the metal nanoparticles have an average particle size (such as particle diameter or longest dimension) of from about 1 to about 1000 nanometers (nm), or about 1 to about 500 nm, or about 1 to about 100 nm, or about 2 to about 20 nm. Herein, "average" particle size is typically represented as $d_{50}$, or defined as the volume median particle size value at the 50th percentile of the particle size distribution, wherein 50% of the particles in the distribution are greater than the $d_{50}$ particle size value, and the other 50% of the particles in the distribution are less than the $d_{50}$ value. Average particle size can be measured by methods that use light scattering technology to infer particle size, such as Dynamic Light Scattering. The particle diameter refers to the length of the pigment particle as derived from images of the particles generated by Transmission Electron Microscopy.

The reducing agent used in the present process herein can be any suitable or desired reducing agent having at least one alcohol functionality, that is, at least one -OH group. In embodiments, the reducing agent can be a polyol. In other embodiments, the reducing agent can be a diol. In embodiments, the reducing agent can be a diol of the formula

HO—R—OH wherein R is (i) an alkylene group, including substituted and unsubstituted alkylene groups, and wherein hetero atoms either may or may not be present in the alkylene group, (ii) an arylene group, including substituted and unsubstituted arylene groups, and wherein hetero atoms either may or may not be present in the arylene group (iii) an arylalkylene group, including substituted and unsubstituted arylalkylene groups, and wherein hetero atoms either may or may not be present in the arylalkylene group, (iv) an alkylarylene group, including substituted and unsubstituted alkylarylene groups, and wherein hetero atoms either may or may not be present in the alkylarylene group, or a combination thereof.

In a specific embodiment, the reducing agent can be a diol of the formula

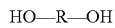

wherein n is an integer of 1 to 20, and wherein the diol has a lower boiling temperature than the second heating stage temperature (the second temperature being a temperature sufficient to effect a metal reduction reaction to reduce the metal salt to metal nanoparticles).

The reducing agents used in the present process can be prepared by any suitable or desired method. Many natural polyols are found in vegetable oils. Examples include castor oil, which is a tri-ester of ricinoleic acid and glycerin. Alternatively, natural oil such as canola oil and soybean oil which do not contain hydroxyl groups but contain an unsaturated bond can be oxidized by ozone in presence of glycol to provide polyols.

Diols are typically prepared by oxidation of hydrocarbons, particularly unsaturated hydrocarbons such as alkenes. Typical oxidizing agents include potassium permanganate and hydrogen peroxide.

In embodiments, a single component can comprise both the reducing agent having at least one alcohol functionality and the ink carrier.

Alcohols, diols and polyols are commercially available. For example, 1,2-hexadecane-diol, diethyleneglycol (DEG), polyethylene glycols, and the like, can be commercially obtained. In embodiments wherein the alcohol is both a reducing agent and a phase change carrier or base material, suitable materials include UNILIN® 700 (long chain fatty alcohol available from Baker Petrolite), UNILIN® 550, and the like.

Any suitable or desired metal can be used in the present process. In embodiments, the metal is selected from the group consisting of Fe, Co, Ni, and combination thereof. Additionally, suitable alloy materials can be used, including, but not limited to, FePt and $SmCo_5$. In specific embodiments, the metal is Fe, Co, Ni, or a combination thereof.

In embodiments, two types of magnetic metal based phase change inks can be obtained by the process herein, depending on the particle size and shape: ferromagnetic phase change ink and superparamagnetic phase change ink.

In embodiments, the metal nanoparticles herein can be ferromagnetic. Ferromagnetic inks become magnetized by a magnet and maintain some fraction of the saturation magnetization once the magnet is removed. The main application of this ink is for Magnetic Ink Character Recognition (MICR) used for checks processing.

In embodiments, the metal nanoparticles herein can be superparamagnetic phase change inks. Superparamagnetic inks are also magnetized in the presence of a magnetic field but they lose their magnetization in the absence of a magnetic field. The main application of superparamagnetic inks is for security printing, although not limited. In this case, an ink containing, for example, magnetic particles as described herein and carbon black appears as a normal black ink but the magnetic properties can be detected by using a magnetic sensor or a magnetic imaging device. Alternatively, a metal detecting device may be used for authenticating the magnetic metal property of secure prints prepared with this ink. A process for superparamagnetic image character recognition (i.e. using superparamagnetic inks) for magnetic sensing is described in U.S. Pat. No. 5,667,924, which is hereby incorporated by reference herein in its entirety.

The metal nanoparticles herein can be bimetallic or trimetallic particles.

Any suitable or desired salt can be used in the present process. For example, the metal salt can be selected from the group consisting of metal acetylacetonate, such as $Fe(acac)_3$ and $Co(acac)_2$, metal hydroxides, such as $Co(OH)_2$ and

Fe(OH)$_2$, or other metal precursors in the presence of hydroxides, such as Co(acetate)$_2$x4H$_2$O and FeCl$_2$x4H$_2$O.

Metal salts for the present process can be prepared by any suitable or desired method. In embodiments, the metal salt can be prepared by reacting metals or metal salts precursors with acids such as hydrochloric acid. Metal salts can also be obtained commercially. For example, Fe(acac)$_3$, Co(acac)$_2$, Co(OH)$_2$, Fe(OH)$_2$, Co(Acetate)$_2$x4H$_2$O, and FeCl$_2$x4H$_2$O are all commercially available from Sigma-Aldrich.

In embodiments, the metal salt is selected from the group consisting of Fe(acac)$_3$, Co(acac)$_2$, Ni(acac)$_2$, Co(OH)$_2$, Fe(OH)$_2$, Co(Acetate)$_2$x4H$_2$O in the presence of hydroxide, and FeCl$_2$x4H$_2$O in the presence of hydroxide.

The MICR phase change ink herein can include any desired or effective carrier composition. Examples of suitable ink carrier materials include fatty amides, such as monoamides, tetraamides, mixtures thereof, and the like. Specific examples of suitable fatty amide ink carrier materials include stearyl stearamide, a dimer acid based tetra-amide that is the reaction product of dimer acid, ethylene diamine, and stearic acid, a dimer acid based tetra-amide that is the reaction product of dimer acid, ethylene diamine, and a carboxylic acid having at least about 36 carbon atoms, and the like, as well as mixtures thereof. When the fatty amide ink carrier is a dimer acid based tetra-amide that is the reaction product of dimer acid, ethylene diamine, and a carboxylic acid having at least about 36 carbon atoms, the carboxylic acid is of the general formula

wherein R is an alkyl group, including linear, branched, saturated, unsaturated, and cyclic alkyl groups, said alkyl group in one embodiment having at least about 36 carbon atoms, in another embodiment having at least about 40 carbon atoms, said alkyl group in one embodiment having no more than about 200 carbon atoms, in another embodiment having no more than about 150 carbon atoms, and in yet another embodiment having no more than about 100 carbon atoms, although the number of carbon atoms can be outside of these ranges. Carboxylic acids of this formula are commercially available from, for example, Baker Petrolite, Tulsa, OK, and can also be prepared as described in Example 1 of U.S. Pat. No. 6,174,937, the disclosure of which is totally incorporated herein by reference. Further information on fatty amide carrier materials is disclosed in, for example, U.S. Pat. Nos. 4,889,560, 4,889,761, 5,194,638, 4,830,671, 5,372,852, 5,597,856, 6,174,937, and British Patent GB 2 238 792, the disclosures of each of which are totally incorporated herein by reference.

Also suitable as phase change ink carrier materials are isocyanate-derived resins and waxes, such as urethane isocyanate-derived materials, urea isocyanate-derived materials, urethane/urea isocyanate-derived materials, mixtures thereof, and the like. Further information on isocyanate-derived carrier materials is disclosed in, for example, U.S. Pat. Nos. 5,750,604, 5,780,528, 5,782,966, 5,783,658, 5,827,918, 5,830,942, 5,919,839, 6,255,432, 6,309,453, British Patent GB 2 294 939, British Patent GB 2 305 928, PCT Publication WO 94/14902, and PCT Publication WO 95/04760, the disclosures of each of which are totally incorporated herein by reference.

Mixtures of fatty amide materials and isocyanate-derived materials can also be employed as the ink carrier composition for inks of the present disclosure.

Additional suitable phase change ink carrier materials for the present disclosure include paraffins, microcrystalline waxes, polyethylene waxes, ester waxes, amide waxes, fatty acids, fatty alcohols, fatty amides and other waxy materials, sulfonamide materials, resinous materials made from different natural sources (such as, for example, tall oil rosins and rosin esters), and many synthetic resins, oligomers, polymers and copolymers, such as ethylene/vinyl acetate copolymers, ethylene/acrylic acid copolymers, ethylene/vinyl acetate/acrylic acid copolymers, copolymers of acrylic acid with polyamides, and the like, ionomers, and the like, as well as mixtures thereof. One or more of these materials can also be employed in a mixture with a fatty amide material and/or an isocyanate-derived material.

Additional ink carrier materials may be added to the ink mixture after formation of the metal nanoparticles. The process herein can include adding a portion of the components of the phase change ink carrier after the formation of the metal nanoparticles. That is, not all of the ink components are added at the beginning, but optionally some components are added later after the nanoparticles are formed. In embodiments, the process herein comprises adding one or more ink carrier components after heating the metal salt-melt composition to a second temperature sufficient to effect a metal reduction reaction to reduce the metal salt to metal nanoparticles.

The carrier can be present in any suitable or desired amount. In embodiments, the ink carrier is present in the phase change ink in an amount of about 0.1 percent to no more than about 99 percent by weight of the ink.

In embodiments, a dispersant may be included in the ink base. The dispersant can be added at any suitable or desired time, such as prior to adding the metal salt or simultaneously when adding the metal salt. The dispersant's role is to ensure improved dispersion stability of the magnetic nanoparticles. Suitable dispersants include those typically used in various solvent based processes including, but not limited to, oleic acid; trioctyl phosphine oxide (TOPO), hexyl phosphonic acid (HPA); polyvinylpyrrolidone (PVP), and combinations thereof. Additional suitable dispersants include beta-hydroxy carboxylic acids and their esters containing long linear, cyclic or branched aliphatic chains, such as those having about 5 to about 60 carbons, such as pentyl, hexyl, cyclohexyl, heptyl, octyl, nonyl, decyl, undecyl, and the like; sorbitol esters with long chain aliphatic carboxylic acids such as lauric acid, oleic acid (SPAN® 85), palmitic acid (SPAN® 40), and stearic acid (SPAN® 60); polymeric compounds such as polyvinylpyrrolidone, poly(1-vinylpyrrolidone)-graft-(1-hexadecene), poly(1-vinylpyrrolidone)-graft-(1-triacontene), poly(1-vinylpyrrolidone-co-acrylic acid), and combinations thereof. In embodiments, the dispersant is selected from the group consisting of oleic acid, lauric acid, palmitic acid, stearic acid, trioctyl phosphine oxide, hexyl phosphonic acid, polyvinylpyrrolidone, poly(1-vinylpyrrolidone)-graft-(1-hexadecene), poly(1-vinylpyrrolidone)-graft-(1-triacontene), poly(1-vinylpyrrolidone-co-acrylic acid)pentyl, hexyl, cyclohexyl, heptyl, octyl, nonyl, decyl, or undecyl beta-hydroxy carboxylic acid, and combinations thereof.

The dispersant can enable control of particle size. In addition the dispersant can enable control of the magnetic nanoparticles shape. In specific embodiments, dispersant is employed to effect production of acicular magnetic nanoparticles. Particle shape anisotropy can provide significant enhancement of the magnetic remanance (i.e. the property responsible, for example, for ferromagmnetic behavior).

Particle shape anisotropy can be provided by selecting two or more different dispersants. For example, rod-shaped iron nanoparticles can be prepared in butanol by using TOPO and didodecyldimethylammonium bromide (DDAB) successively. For further detail, see, for example, J. Park et al., J. Am. Chem. Soc., 2000, 122, 8581-2). Cobalt nanoparticles can be obtained in dichlorobenzene from $Co_2(CO)_8$ by using TOPO and oleic acid as two different dispersants.

The dispersant can be present in any suitable or desired amount. In embodiments, the dispersant is present in the phase change ink in an amount of about 0.01 percent to about 50 percent by weight of the ink.

The phase change inks of the present disclosure can further contain a colorant compound. This optional colorant can be present in the ink in any desired or effective amount to obtain the desired color or hue, in embodiments from about 1 percent to about 20 percent by weight of the ink. The colorant can be any suitable or desired colorant including dyes, pigments, mixtures thereof, and the like. In embodiments, the phase change magnetic inks can include a pigment, specifically, a black pigment.

The inks of the present disclosure can also optionally contain an antioxidant. The optional antioxidants of the ink compositions protect the images from oxidation and also protect the ink components from oxidation during the heating portion of the ink preparation process. Specific examples of suitable antioxidants include NAUGUARD® 524, NAUGUARD® 76, and NAUGUARD® 512, commercially available from Uniroyal Chemical Company, Oxford, CT, IRGANOX® 1010, commercially available from Ciba Geigy, and the like. When present, the optional antioxidant is present in the ink in any desired or effective amount, such as from about 0.01 percent to about 20 percent by weight of the ink.

The inks of the present disclosure can also optionally contain a viscosity modifier. Examples of suitable viscosity modifiers include aliphatic ketones, such as stearone, and the like. When present, the optional viscosity modifier is present in the ink in any desired or effective amount, such as from about 0.1 to about 99 percent by weight of the ink.

Other optional additives to the inks include clarifiers, tackifiers, adhesives, plasticizers, and the like, in any suitable or desired amount such as from about 0.1 to about 50 percent by weight of the ink.

In embodiments, the MICR phase change ink compositions herein have melting points of no lower than about 50° C. and no higher than about 180° C., although the melting point can be outside of these ranges.

In embodiments, the MICR phase change ink compositions herein have melt viscosities at the jetting temperature (in embodiments no lower than about 75° C. and no higher than about 180° C., although the jetting temperature can be outside of these ranges) of no more than about 30 centipoise or no less than about 1 centipoise, although the melt viscosity can be outside of these ranges.

The MICR phase change inks of the present disclosure can be employed in apparatus for direct printing ink jet processes and in indirect (offset) printing ink jet applications. Another embodiment of the present disclosure is directed to a process which comprises incorporating a MICR phase change ink of the present disclosure into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. In embodiments, the substrate is a final recording sheet and droplets of the melted ink are ejected in an imagewise pattern directly onto the final recording sheet. Yet another embodiment of the present disclosure is directed to a process which comprises incorporating an ink of the present disclosure into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. In embodiments, the intermediate transfer member is heated to a temperature above that of the final recording sheet and below that of the melted ink in the printing apparatus. Inks of the present disclosure can also be employed in other hot melt printing processes, such as hot melt acoustic ink jet printing, hot melt thermal ink jet printing, hot melt continuous stream or deflection ink jet printing, and the like. Phase change inks of the present disclosure can also be used in printing processes other than hot melt ink jet printing processes.

In embodiments, a process herein comprises (1) incorporating into an ink jet printing apparatus a phase change magnetic ink comprising a carrier, an optional colorant, an optional dispersant, and metal nanoparticles dispersed within the phase change ink, wherein the metal nanoparticles are functionalized with at least one of the phase change ink composition components, alcohol functional groups within the phase change ink composition, and the optional dispersant, which stabilize the metal nanoparticles in the phase change ink; (2) melting the ink; and (3) causing droplets of the melted ink to be ejected in an imagewise pattern onto a substrate.

Any suitable substrate or recording sheet can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, Hammermill Laserprint Paper, and the like, transparency materials, fabrics, textile products, plastics, polymeric films, inorganic substrates such as metals and wood, and the like.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Example 1

Iron Containing Magnetic Ink Preparation. While in an inert atmosphere of Argon, 31.5 grams of iron acetylacetonate(III) [Fe(III)(acac)$_3$] were added as a solid powder in small portions to 90 grams of melted UNILIN® 700 (long chain fatty alcohol available from Baker Petrolite) at 140° C. in a 4 neck kettle equipped with a condenser which was previously degassed under vacuum and refilled with argon. Then the temperature was raised to 280° C. The mixture was stirred for 5 hours at this temperature. The reaction mixture became black, an indication of the formation of iron nanoparticles. The mixture was allowed to cool down and to solidify at room temperature.

Example 2

Figure 2:
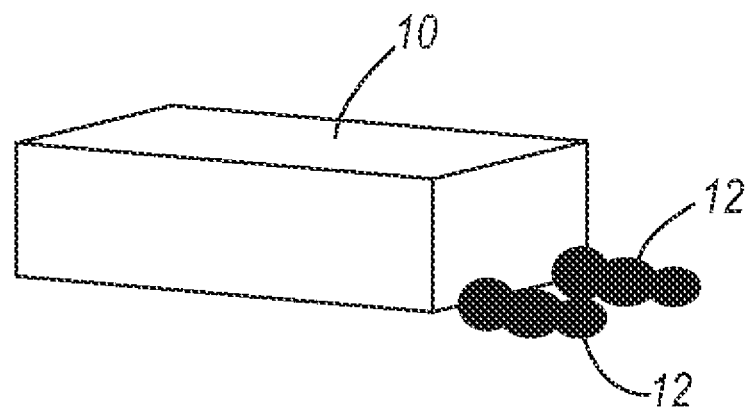
FIG. 2 is a representation of ink chunks of the present disclosure adhering to the magnet.

Magnetic Property Demonstration. Turning to FIG. 1, a magnet 10 was placed at a distance from small chunks of black solid inks 12 described in Example 1. The chunks of solid ink 12 were attracted to a magnet 10 when placed in close enough proximity to it as illustrated in FIG. 2. This behavior was similar to iron filings which were attracted to a magnet. This demonstrated that the inks contain metal nanoparticles which rendered them magnetically active.

In various embodiments, magnetic phase change inks herein can be prepared by reduction of magnetic metal salts in a phase change ink composition containing non-volatile alcohol functionalized components. The process is a cost-effective one step process for preparing a phase change MICR ink. Advantages of the present process when compared with a typical pigment dispersion fabrication include: provision for a highly dispersible magnetic ink; provision for a highly stable ink (no settling of particles); process provides for safe handling of metal nanoparticles as they are already functionalized and "ink-ready;" provision of a cost effective process as much of the tedious and laborious conventional multistep pigment processes are avoided; a green process (no solvents used in the preparation and isolation of product) and reduced energy required; provides a MICR phase change ink suitable for phase change and solid ink technology platforms. The process and MICR phase change ink herein can further be used in additional applications including authentication of secure printed documents by detection of their inherent magnetic property.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. An in situ process for preparing a phase change magnetic ink comprising:
   combining a phase change ink composition with a reducing agent;
   wherein the phase change ink composition comprises a carrier, an optional colorant, and an optional dispersant, and wherein the reducing agent has at least one alcohol functionality;
   heating the combined phase ink composition and reducing agent to a first temperature sufficient to provide a melt composition;
   adding a metal salt to the melt composition under an inert atmosphere to provide a metal salt-melt composition;
   heating the metal salt-melt composition to a second temperature sufficient to effect a metal reduction reaction to reduce the metal salt to metal nanoparticles thus forming in situ a phase change magnetic ink including the metal nanoparticles;
   optionally, filtering the phase change magnetic ink while in a liquid state, and;
   cooling the phase change magnetic ink to a solid state.

2. The process of claim 1, wherein the at least one reducing agent comprises a polyol or a diol.

3. The process of claim 1, wherein the at least one reducing agent comprises a diol of the formula $$HO-R-OH$$

wherein R is (i) an alkylene group, including substituted and unsubstituted alkylene groups, and wherein hetero atoms either may or may not be present in the alkylene group, (ii) an arylene group, including substituted and unsubstituted arylene groups, and wherein hetero atoms either may or may not be present in the arylene group (iii) an arylalkylene group, including substituted and unsubstituted arylalkylene groups, and wherein hetero atoms either may or may not be present in the arylalkylene group, or (iv) an alkylarylene group, including substituted and unsubstituted alkylarylene groups, and wherein hetero atoms either may or may not be present in the alkylarylene group.

4. The process of claim 1, wherein the at least one reducing agent comprises a diol of the formula $$HO-(CH_2)_n-OH$$

wherein n is an integer of 1 to 20.

5. The process of claim 1, wherein the metal ion of the metal salt is selected from the group consisting of $Fe^{2+}$, $Fe^{3+}$, $Co^{2+}$, $Ni^{2+}$, and combinations thereof; or
   wherein the metal ion of the metal salt is selected from the group consisting of $Fe^{2+}$, $Fe^{3+}$, $Co^{2+}$, and $Ni^{2+}$, in combination with at least one of $Pt^{2+}$ and $Sm^{2+}$.

6. The process of claim 1, wherein the metal salt is selected from the group consisting of metal acetylacetonate, metal hydroxide, and metal precursors in the presence of hydroxide.

7. The process of claim 1, wherein the metal salt is selected from the group consisting of $Fe(acac)_3$, $Co(acac)_2$, $Ni(acac)_2$, $Co(OH)_2$, $Fe(OH)_2$, $Co(Acetate)_2 \times 4H_2O$ in the presence of hydroxide, and $FeCl_2 \times 4H_2O$ in the presence of hydroxide.

8. The process of claim 1, wherein the metal nanoparticles are bimetallic or trimetallic particles.

9. The process of claim 1, wherein process comprises a solvent-free process.

10. The process of claim 1, wherein the phase change ink carrier comprises one or more materials selected from paraffins, microcrystalline waxes, polyethylene waxes, ester waxes, amide waxes, fatty acids, fatty alcohols, fatty amides, sulfonamide materials, tall oil rosins, rosin esters, ethylene/vinyl acetate copolymers, ethylene/acrylic acid copolymers, ethylene/vinyl acetate/acrylic acid copolymers, copolymers of acrylic acid with polyamides, ionomers, and mixtures thereof.

11. The method of claim 1, further comprising:
    adding one or more ink carrier components after heating the metal salt-melt composition to a second temperature sufficient to effect a metal reduction reaction to reduce the metal salt to metal nanoparticles.

12. The method of claim 1, wherein a single component comprises both the reducing agent having at least one alcohol functionality and the ink carrier.

13. The method of claim 1, wherein the dispersant is selected from the group consisting of oleic acid, lauric acid, palmitic acid, stearic acid, trioctyl phosphine oxide, hexyl phosphonic acid, polyvinylpyrrolidone, poly(1-vinylpyrrolidone)-graft-(1-hexadecene), poly(1-vinylpyrrolidone)-graft-(1-triacontene), poly(1-vinylpyrrolidone-co-acrylic acid), pentyl, hexyl, cyclohexyl, heptyl, octyl, nonyl, decyl, or undecyl beta-hydroxy carboxylic acid, and combinations thereof.

14. A phase change magnetic ink comprising:
    a phase change ink composition comprising a carrier, an optional colorant, an optional dispersant, and
    metal nanoparticles dispersed within the phase change ink, wherein the metal nanoparticles are functionalized with at least one of the phase change ink composition components, alcohol functional groups within the phase change ink composition, and the optional dispersant, which stabilize the metal nanoparticles in the phase change ink.

15. The phase change magnetic ink of claim 14, wherein the metal nanoparticles are ferromagnetic or superparamagnetic.

16. The phase change magnetic ink of claim 14, wherein the metal nanoparticles are bimetallic or trimetallic particles.

17. The phase change magnetic ink of claim 14, wherein the metal nanoparticles are selected from the group consisting of Fe, Co, FePt, Ni, $SmCo_5$, and combinations thereof.

18. The phase change magnetic ink of claim 14, wherein the phase change ink carrier comprises one or more materials selected from paraffins, microcrystalline waxes, polyethylene waxes, ester waxes, amide waxes, fatty acids, fatty alcohols, fatty amides, sulfonamide materials, tall oil rosins, rosin esters, ethylene/vinyl acetate copolymers, ethylene/acrylic acid copolymers, ethylene/vinyl acetate/acrylic acid copolymers, copolymers of acrylic acid with polyamides, ionomers, and mixtures thereof.

19. The phase change magnetic ink of claim 14, wherein the dispersant is selected from the group consisting of oleic acid, lauric acid, palmitic acid, stearic acid, trioctyl phosphine oxide, hexyl phosphonic acid, polyvinylpyrrolidone, poly(1-vinylpyrrolidone)-graft-(1-hexadecene), poly(1-vinylpyrrolidone)-graft-(1-triacontene), poly(1-vinylpyrrolidone-co-acrylic acid), pentyl, hexyl, cyclohexyl, heptyl, octyl, nonyl, decyl, or undecyl beta-hydroxy carboxylic acid, and combinations thereof.

20. A process which comprises:
(1) incorporating into an ink jet printing apparatus a phase change magnetic ink comprising a carrier, an optional colorant, an optional dispersant, and metal nanoparticles dispersed within the phase change ink, wherein the metal nanoparticles are functionalized with at least one of the phase change ink composition components, alcohol functional groups within the phase change ink composition, and the optional dispersant, which stabilize the metal nanoparticles in the phase change ink;
(2) melting the ink; and
(3) causing droplets of the melted ink to be ejected in an imagewise pattern onto a substrate.

* * * * *